US011551515B2

(12) United States Patent
Paradise et al.

(10) Patent No.: US 11,551,515 B2
(45) Date of Patent: *Jan. 10, 2023

(54) PEER-TO-PEER WAGERING PLATFORM

(71) Applicant: Skillz Platform Inc., San Francisco, CA (US)

(72) Inventors: Andrew Paradise, San Francisco, CA (US); Casey Chafkin, Boston, MA (US); Jason Petralia, Winchester, MA (US); Ahmed Abdalla, North Attleboro, MA (US)

(73) Assignee: Skillz Platform, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/992,618

(22) Filed: Aug. 13, 2020

(65) Prior Publication Data
US 2021/0225121 A1 Jul. 22, 2021

Related U.S. Application Data

(63) Continuation of application No. 16/382,890, filed on Apr. 12, 2019, now Pat. No. 10,748,373, which is a
(Continued)

(51) Int. Cl.
*G07F 17/32* (2006.01)
*A63F 13/61* (2014.01)
(Continued)

(52) U.S. Cl.
CPC .......... *G07F 17/3223* (2013.01); *A63F 13/00* (2013.01); *A63F 13/61* (2014.09);
(Continued)

(58) Field of Classification Search
CPC ...................................................... G07F 17/32
See application file for complete search history.

(56) References Cited

U.S. PATENT DOCUMENTS

| 462,448 | A | 11/1891 | Paine et al. |
| 5,169,155 | A | 12/1992 | Soules et al. |
| (Continued) | | | |

FOREIGN PATENT DOCUMENTS

| CA | 2464498 A1 | 10/2005 |
| CN | 1853205 A | 10/2006 |
| (Continued) | | |

OTHER PUBLICATIONS

Ke et al. (2008) "Random and pseudo-random numbers" Network Security Protocol, 4 pages. (Only Machine translation).
(Continued)

*Primary Examiner* — Omkar A Deodhar
(74) *Attorney, Agent, or Firm* — Mintz Levin Cohn Ferris Glovsky and Popeo, P.C.

(57) ABSTRACT

Data characterizing historical skills-based gaming metrics for a first user and historical skills-based gaming metrics for at least one second user is accessed. Using the accessed data and a set of rules, a targeted advertisement to present to the first user is determined. The targeted advertisement specifies at least one skills-based game and a characterization of the at least one second user's historical skills-based gaming metrics. The targeted advertisement is generated. Data characterizing the targeted advertisement is provided. Related apparatus, systems, techniques, and articles are also described.

20 Claims, 12 Drawing Sheets

Related U.S. Application Data continuation of application No. 15/595,794, filed on May 15, 2017, now Pat. No. 10,290,179, which is a continuation of application No. 14/976,569, filed on Dec. 21, 2015, now Pat. No. 9,649,564, which is a continuation of application No. 14/212,651, filed on Mar. 14, 2014, now Pat. No. 9,240,101, which is a continuation of application No. 13/858,581, filed on Apr. 8, 2013, now Pat. No. 8,715,077, which is a continuation-in-part of application No. 13/569,424, filed on Aug. 8, 2012, now Pat. No. 8,414,387.

(51) Int. Cl.
*A63F 13/00* (2014.01)
*A63F 13/80* (2014.01)

(52) U.S. Cl.
CPC ............ *A63F 13/80* (2014.09); *G07F 17/323* (2013.01); *G07F 17/3244* (2013.01); *G07F 17/3276* (2013.01)

(56) References Cited

U.S. PATENT DOCUMENTS

| | | |
|---|---|---|
| 5,779,545 A | 7/1998 | Berg et al. |
| 5,823,879 A | 10/1998 | Goldberg et al. |
| 5,882,260 A | 3/1999 | Marks et al. |
| 6,533,664 B1 | 3/2003 | Crumby |
| 6,557,120 B1 | 4/2003 | Nicholson et al. |
| 6,676,517 B2 | 1/2004 | Beavers |
| 6,790,143 B2 | 9/2004 | Crumby |
| 7,048,629 B2 | 5/2006 | Sines et al. |
| 7,160,189 B2 | 1/2007 | Walker et al. |
| 7,329,183 B2 | 2/2008 | Michaelson et al. |
| 7,479,062 B2 | 1/2009 | Michaelson |
| 7,486,273 B1 | 2/2009 | Aviles et al. |
| 7,517,282 B1 | 4/2009 | Pryor |
| 7,589,742 B2 | 9/2009 | Street et al. |
| 7,658,672 B1 | 2/2010 | Wolf et al. |
| 7,692,573 B1 | 4/2010 | Funk |
| 7,758,411 B2 | 7/2010 | Crawford et al. |
| 8,147,334 B2 | 4/2012 | Gatto et al. |
| 8,152,643 B2 | 4/2012 | Halliburton et al. |
| 8,235,800 B2 | 8/2012 | Gingher |
| 8,287,354 B2 | 10/2012 | Gail et al. |
| 8,371,921 B1 | 2/2013 | Perrone et al. |
| 8,414,387 B1 | 4/2013 | Paradise et al. |
| 8,475,255 B2 | 7/2013 | Wolf et al. |
| 8,512,125 B2 | 8/2013 | Weber et al. |
| 8,523,684 B2 | 9/2013 | Lutnick et al. |
| 8,589,488 B2 | 11/2013 | Huston et al. |
| 8,678,902 B2 | 3/2014 | Kelly et al. |
| 8,715,077 B2 | 5/2014 | Paradise et al. |
| 8,732,780 B2 | 5/2014 | Kahn et al. |
| 8,758,106 B2 | 6/2014 | Wolf et al. |
| 8,840,462 B2 | 9/2014 | Patel et al. |
| 8,851,980 B2 | 10/2014 | Versaci |
| 8,864,588 B2 | 10/2014 | Karsten |
| 9,155,968 B2 | 10/2015 | Hedrick et al. |
| 9,214,058 B2 | 12/2015 | Kelly et al. |
| 9,240,101 B2 | 1/2016 | Paradise et al. |
| 9,266,017 B1 | 2/2016 | Parker et al. |
| 9,300,704 B2 | 3/2016 | Petersen et al. |
| 9,311,776 B2 | 4/2016 | Crowder et al. |
| 9,317,996 B2 | 4/2016 | Pierce et al. |
| 9,430,909 B2 | 8/2016 | Shore et al. |
| 9,489,793 B2 | 11/2016 | Williams et al. |
| 9,524,619 B2 | 12/2016 | Colvin et al. |
| 9,552,191 B2 | 1/2017 | Oram |
| 9,569,932 B2 | 2/2017 | Nicely et al. |
| 9,589,417 B2 | 3/2017 | Frenkel et al. |
| 9,607,474 B2 | 3/2017 | Nguyen et al. |
| 9,649,564 B2 | 5/2017 | Paradise et al. |
| 9,711,003 B2 | 7/2017 | Carter, Sr. |
| 9,833,699 B2 | 12/2017 | Rouse et al. |
| 10,068,422 B2 | 9/2018 | Gadher et al. |
| 10,068,425 B2 | 9/2018 | Colvin et al. |
| 10,089,608 B2 | 10/2018 | Cage et al. |
| 10,135,943 B2 | 11/2018 | Palandurkar |
| 10,210,705 B2 | 2/2019 | Frenkel et al. |
| 10,255,753 B2 | 4/2019 | Merati |
| 10,290,179 B2 | 5/2019 | Paradise et al. |
| 10,510,214 B2 | 12/2019 | Amaitis et al. |
| 10,532,283 B2 | 1/2020 | Parker et al. |
| 10,614,657 B2 | 4/2020 | Koustas et al. |
| 10,657,768 B2 | 5/2020 | Northrup et al. |
| 10,748,373 B2 | 8/2020 | Paradise et al. |
| 11,017,630 B2 | 5/2021 | Williams et al. |
| 11,024,131 B2 | 6/2021 | Simons et al. |
| 2003/0087701 A1 | 5/2003 | Paravia et al. |
| 2003/0130029 A1 | 7/2003 | Crumby |
| 2004/0053675 A1 | 3/2004 | Nguyen et al. |
| 2004/0166942 A1 | 8/2004 | Muir |
| 2004/0167792 A1 | 8/2004 | Diehl et al. |
| 2005/0085290 A1 | 4/2005 | Schugar |
| 2005/0090307 A1 | 4/2005 | Walker et al. |
| 2005/0179206 A1 | 8/2005 | Cogert |
| 2005/0197190 A1 | 9/2005 | Amaitis et al. |
| 2005/0288101 A1 | 12/2005 | Lockton et al. |
| 2006/0030405 A1 | 2/2006 | Robertson |
| 2006/0040735 A1 | 2/2006 | Baerlocher |
| 2006/0058084 A1 | 3/2006 | Crawford et al. |
| 2006/0058103 A1 | 3/2006 | Danieli et al. |
| 2006/0068895 A1 | 3/2006 | Nguyen et al. |
| 2006/0082056 A1 | 4/2006 | Kane et al. |
| 2006/0247053 A1 | 11/2006 | Mattila |
| 2007/0004509 A1 | 1/2007 | Banton |
| 2007/0054739 A1 | 3/2007 | Amaitis et al. |
| 2007/0072676 A1 | 3/2007 | Baluja |
| 2007/0129147 A1 | 6/2007 | Gagner |
| 2007/0167210 A1 | 7/2007 | Kelly et al. |
| 2007/0191101 A1 | 8/2007 | Coliz et al. |
| 2007/0235939 A1 | 10/2007 | Ko |
| 2007/0265092 A1 | 11/2007 | Betteridge |
| 2008/0015013 A1 | 1/2008 | Gelman et al. |
| 2008/0207296 A1 | 8/2008 | Lutnick et al. |
| 2008/0214301 A1 | 9/2008 | Sandige et al. |
| 2009/0011834 A1 | 1/2009 | Chhabra |
| 2009/0036188 A1 | 2/2009 | Gelman |
| 2009/0131175 A1 | 5/2009 | Kelly et al. |
| 2009/0170608 A1 | 7/2009 | Herrmann et al. |
| 2009/0209350 A1 | 8/2009 | Kelly et al. |
| 2009/0275371 A1 | 11/2009 | Takahashi et al. |
| 2009/0318219 A1 | 12/2009 | Koustas et al. |
| 2010/0022307 A1 | 1/2010 | Steuer et al. |
| 2010/0121896 A1 | 5/2010 | Oram |
| 2010/0144426 A1 | 6/2010 | Winner et al. |
| 2010/0151938 A1 | 6/2010 | Boesen |
| 2010/0311496 A1 | 12/2010 | Taylor et al. |
| 2012/0028718 A1 | 2/2012 | Barclay et al. |
| 2012/0084364 A1 | 4/2012 | Sivavakeesar |
| 2012/0122558 A1 | 5/2012 | Lyons et al. |
| 2012/0178514 A1 | 7/2012 | Schulzke et al. |
| 2013/0029745 A1 | 1/2013 | Kelly et al. |
| 2013/0110895 A1 | 5/2013 | Valentino et al. |
| 2013/0130807 A1 | 5/2013 | Youm et al. |
| 2013/0159076 A1 | 6/2013 | Heisler et al. |
| 2014/0045589 A1 | 2/2014 | Paradise et al. |
| 2014/0074918 A1 | 3/2014 | Wang et al. |
| 2014/0087807 A1 | 3/2014 | Kearns |
| 2014/0200062 A1 | 7/2014 | Paradise et al. |
| 2014/0243059 A1 | 8/2014 | Arnone et al. |
| 2014/0342835 A1 | 11/2014 | Bell et al. |
| 2015/0094135 A1 | 4/2015 | Hedrick et al. |
| 2015/0133223 A1 | 5/2015 | Carter, Sr. |
| 2015/0375102 A1 | 12/2015 | George |
| 2016/0110960 A1 | 4/2016 | Paradise et al. |
| 2016/0168860 A1 | 6/2016 | Stucky et al. |
| 2016/0321864 A1 | 11/2016 | Burman et al. |
| 2017/0249802 A1 | 8/2017 | Paradise et al. |
| 2017/0263077 A1 | 9/2017 | Lyons et al. |

(56) References Cited

U.S. PATENT DOCUMENTS

| | | | |
|---|---|---|---|
| 2019/0228612 | A1 | 7/2019 | Pierce et al. |
| 2019/0236894 | A1 | 8/2019 | Paradise et al. |
| 2020/0051376 | A1 | 2/2020 | Lutnick et al. |

FOREIGN PATENT DOCUMENTS

| | | | |
|---|---|---|---|
| CN | 1894694 | A | 1/2007 |
| CN | 101044520 | A | 9/2007 |
| CN | 101090759 | A | 12/2007 |
| CN | 101128852 | A | 2/2008 |
| CN | 101356533 | A | 1/2009 |
| CN | 102209105 | A | 10/2011 |
| CN | 102497358 | A | 6/2012 |
| CN | 103945912 | A | 7/2014 |
| EP | 1088575 | A2 | 4/2001 |
| EP | 1738810 | A1 | 1/2007 |
| JP | 2001175761 | A | 6/2001 |
| JP | 2003144745 | A | 5/2003 |
| JP | 2003225460 | A | 8/2003 |
| JP | 2006305307 | A | 11/2006 |
| JP | 2009526603 | A | 7/2009 |
| JP | 2010017258 | A | 1/2010 |
| KR | 20070110544 | A | 11/2007 |
| KR | 20110068218 | A | 6/2011 |
| KR | 1020120005072 | A | 1/2012 |
| KR | 1020120053497 | A | 5/2012 |
| WO | 9739811 | A1 | 10/1997 |
| WO | 9823340 | A1 | 6/1998 |
| WO | 2004114188 | A1 | 12/2004 |
| WO | 2007072019 | A2 | 6/2007 |
| WO | 2010004864 | A1 | 1/2010 |
| WO | 2014025971 | A1 | 2/2014 |

OTHER PUBLICATIONS

Gillett et al. (1991) "An Introduction to Engineered Software", Software Engineering, 7 pages.
Kruse et al. (2005) "Data Structure and Programming—C Language", Beijing: Tsinghua University Press, 1 page.
Qin et al. (2008) "Network Security Protocol [M]", Yishuleia Database, Section 2.4, 2 pages.
Claim Chart, Exhibit A-11 to AviaGames Inc.'s Invalidity Contentions, 37 pages.
Claim Chart, Exhibit A-12 to AviaGames Inc.'s Invalidity Contentions, 40 pages.
Claim Chart, Exhibit A-13 to AviaGames Inc.'s Invalidity Contentions, 35 pages.
Claim Chart, Exhibit A-14 to AviaGames Inc.'s Invalidity Contentions, 38 pages.
Claim Chart, Exhibit A-15 to AviaGames Inc.'s Invalidity Contentions, 35 pages.
Claim Chart, Exhibit A-16 to AviaGames Inc.'s Invalidity Contentions, 44 pages.
"Dice",The British Museum, 1 page (IPR 2022-00531 EX. 1010).
"Games of Chance: Gambling Devices of the Mechanical Age", 3 pages. (IPR 2022-00531 EX. 1012).
(May 24, 2012) Nevada Gaming Control Board Notice to Licensees, accessed at https://gaming.nv.gov/modules/showdocument.aspx?documentid=3450, 12 pages.
"Print; Playing-Card", The British Museum, 1 page. (IPR 2022-00531 EX.1011).
(2013) Regular Session New Jersey Assembly Bill 2578, NJ A2578.
(Dec. 1, 2011) Report on the Possible Regulation of Intrastate Internet Poker in the State of Iowa Report on the Possible Regulation of Intrastate Internet Poker in the State of Iowa, Iowa Racing and Gaming Commission, 168 pages.
The WBF Code of Laws for Electronic Bridge 2001 Promulgated by the World Bridge Federation, 75 pages. (IPR 2022-00531 EX. 1032).

U.S. Before the Patent Trial and Appeal Board U.S. Pat. Nos. 9,479,602 and 9,649,564, dated Feb. 15, 2022, 485 pages. (IPR 2022-00531 EX. 1003, Part 1).
U.S. Before the Patent Trial and Appeal Board U.S. Pat. Nos. 9,479,602 and 9,649,564, dated Feb. 15, 2022, Feb. 7, 2022,216 pages. (IPR 2022-00531 EX. 1003, Part 2).
U.S. Before the Patent Trial and Appeal Board U.S. Pat. Nos. 9,479,602 and 9,649,564, dated Feb. 15, 2022, 250 pages. (IPR 2022-00531 EX. 1003, Part 3).
U.S. District Court Northern District of California San Francisco Division, case No. 5:21-cv-02436-BLF, Filed on Jan. 10, 2022, 9pages. (IPR 2022-00531 EX. 1017).
U.S. District Court Northern District of California, case No. 21-cv-02436-BLF,dated Feb. 15, 2022, 77 pages. (IPR 2022-00531 EX. 1018).
U.S. Pat. No. 9,649,564 Claim Listing, 3 pages. (IPR 2022-00531 EX. 1025).
U.S. Petition for Inter Partes Review of U.S. Pat. Nos. 9,649,564, dated Feb. 15, 2022, 91 pages.
U.S. Utility Patent Application Transmittal, dated Feb. 15, 2022, 203 pages. (IPR 2022-00531 EX. 1002).
U.S. Utility Patent Application Transmittal, dated Feb. 15, 2022, 155 pages. (IPR 2022-00531 EX 1021).
U.S. Utility Patent Application Transmittal, dated Feb. 15, 2022, 176 pages. (IPR 2022-00531 EX 1023).
U.S. Utility Patent Application Transmittal, dated Feb. 15, 2022, 124 pages. (IPR 2022-00531 EX 1019).
Douceur et al. (2007) "Enhancing Game-Server AI with Distributed Client Computation", 6 pages.
Dutang et al. (Sep. 2009) "A Note On Random Number Generation", 25 pages.
Gainsbury et al. (2015) "The Use of Social Media in Gambling", A report commissioned by Gambling Research Australia, 337 pages.
Galton Francis (May 1, 1890) "Dice for Statistical Experiments", Nature, 42:13-14 (5 pages). (IPR 2022-00531 Ex 1027).
king.com (Jan. 16, 2013) "Community", retrieved from https://web.archive.org/web/20130116121352/http:/www.king.com/community/, 2 pages.
king.com (Jan. 16, 2013) "Games", retrieved from https://web.archive.org/web/20130116113545/http:/about.king.com/games, 9 pages.
king.com (Jan. 31, 2013) "Games Online", retrieved from https://web.archive.org/web/20130131004232/http:/www.king.com/, 3 pages.
king.com (Oct. 29, 2012) "Gin Rummy", retrieved from https://web.archive.org/web/20121029022933/http://www.king.com/games/card-games/gin-rummy/, 1 page.
king.com (Jan. 16, 2013) "How it Works", retrieved from https://web.archive.org/web/20130116115853/http:/www.king.com/how_it_works.jsp, 2 pages.
king.com (Jan. 7, 2013) "Privacy Policy", retrieved from https://web.archive.org/web/20130107225634/http:/about.king.com/privacy, 2 pages.
king.com (May 21, 2013) "Signup", retrieved from https://web.archive.org/web/20130521202607/https:/www.king.com/signup.jsp, 1 page.
Komenda Ed (Sep. 24, 2013) "How Online Poker Companies Track Players and Verify Their Location", Vegas Inc coverage, 4 pages.
Korf et al. (Jul. 1996) "Best-first Minimax Search", Artificial Intelligence, 84(1-2):299-337.
Marins et al. (2011) "SmartRabbit: A Mobile Exergame Using Geolocation", SBC—Proceedings of SBGames.
Neumann John V. "Various Techniques Used in Connection With Random Digits", 3 pages. (IPR 2022-00531 EX. 1013).
Press et al. "Numerical Recipes in C", The Art of Scientific Computing Second Edition, 9 pages. (IPR 2022-00531 EX. 1028).
Rutter et al. (Mar. 2004) "Mobile Entertainment Users: Headline Results from an Online Survey".
Srinivasan et al. (Jan. 2003) "Testing Parallel Random Number Generators", Parallel Computing, 29(1):69-94.
Stankiewicz Matthew J. (May 1, 2013) "All In: New Jersey Bets on Online Gambling", Law School Student Scholarship, 32 pages.
Winands et al. (Sep. 2012) "Computer Games Workshop at ECAI 2012", ICGA Journal, 2 pages.

(56) References Cited

OTHER PUBLICATIONS

Wong et al., "Casino Tournament Strategy", 3 pages. (IPR 2022-00531 EX. 1030).
"AviaGames Inc.'s Invalidity Contentions", United States District Court, Northern District of California, San Jose Division, 29 pages.
Claim Chart, Exhibit A-1 to AviaGames Inc.'s Invalidity Contentions, 11 pages.
Claim Chart, Exhibit A-2 to AviaGames Inc.'s Invalidity Contentions, 34 pages.
Claim Chart, Exhibit A-3 to AviaGames Inc.'s Invalidity Contentions, 38 pages.
Claim Chart, Exhibit A-4 to AviaGames Inc.'s Invalidity Contentions, 42 pages.
Claim Chart, Exhibit A-5 to AviaGames Inc.'s Invalidity Contentions, 37 pages.
Claim Chart, Exhibit A-6 to AviaGames Inc.'s Invalidity Contentions, 33 pages.
Claim Chart, Exhibit A-7 to AviaGames Inc.'s Invalidity Contentions, 42 pages.
Claim Chart, Exhibit A-8 to AviaGames Inc.'s Invalidity Contentions, 38 pages.
Claim Chart, Exhibit A-9 to AviaGames Inc.'s Invalidity Contentions, 36 pages.
Claim Chart, Exhibit A-10 to AviaGames Inc.'s Invalidity Contentions, 19 pages.
Cazenave et al. (Aug. 27, 2012) "Computer Games Workshop at ECAI 2012", ICGA Journal, 142 pages.
Claim Chart, Exhibit A-17 to AviaGames Inc.'s Amended Invalidity Contentions, Age of Empires 3 System, 21 pages.
Claim Chart, Exhibit A-18 to AviaGames Inc.'s Amended Invalidity Contentions, Civilization 5 System, 19 pages.
Claim Chart, Exhibit A-19 to AviaGames Inc.'s Amended Invalidity Contentions, Minecraft System, 17 pages.
Claim Chart, Exhibit A-20 to AviaGames Inc.'s Amended Invalidity Contentions, Empire Earth 2 System, 16 pages.
Claim Chart, Exhibit A-21 to AviaGames Inc.'s Amended Invalidity Contentions, U.S. Pat. No. 9,649,564, "Goldberg" 19 pages.
(May 24, 2012) Technical Policies of the Nevada Gaming Control Board and Gaming Commission as they Relate to Gaming Devices and Gaming Associated Equipment, Gaming Control Board, 12 pages.
"AviaGames Inc.'s Amended Invalidity Contentions", United States District Court, Northern District of California, San Jose Division, 23 pages.
Claim Chart, Exhibit A-14B to AviaGames Inc.'s Amended Invalidity Contentions, U.S. Pat. No. 2010/0022307 "Steuer", 40 pages.
Song, Brian, "Civilization V Manual", SID Meier's Civilization V, 233 pgs.
Schulte, Andy (Jun. 2005) "Scenario Editor Guide for Age of Empires 3", Age of Empires 3, cheatcodes.com, 13 pgs.
(2005) "Age of Empires 3 User's Manual", Microsoft Corporation, 80 pgs.
Fandom Games Community, "Random Map" Age of Empires Wiki, 24 pgs.
"Minecraft Mobile Manual" www.mobileminecraft.com, 3 pgs.
"Empire Earth 2 Manual 1", 2 pgs.
(2005) "Empire Earth 2 Manual 2", www.empireearth2.com, Sierra Entertainment, Inc. 2 pgs.
Patent Trial and Appeal Board Decision Denying Institution of Inter Partes Review of U.S. Pat. No. 9,649,564 B2, IPR2022-00531 (*Aviagames, Inc., Petitioner* v. *Skillz Platform Inc.*, Patent Owner), Aug. 4, 2022, 42 pages.

| Name | Type | # of Players | Entry $ | Prize $ | Time Left |
|---|---|---|---|---|---|
| James Game 520 | Highest Score | 10/12 | $1.00 | $10.00 | 0:58 |
| Killer Elite | Lowest Time | 30/35 | $5.00 | $125.00 | 1:23 |
| Noobies r us | Highest Score | 8/10 | $0.25 | $2.00 | 0:21 |

Name: James Game
Type: Highest Score
Players/Max: 10/12
Entry fee: $1.00
Prizes:
1st Prize: $7.50
2nd Prize: $1.50
3rd Prize: $1.00

| Player Name | Rank |
|---|---|
| Madmax | 2341 |
| Dangerous | 1230 |
| Hothanded | 1700 |
| Smileandshoot | 2441 |
| James | 1200 |
| Lotsaluck | 1340 |
| Sean's Skills | 3112 |
| Playcation | 2710 |
| Winner! | 1020 |
| Bonfan | 1423 |

Cancel
Play

FIG. 5

PEER-TO-PEER WAGERING PLATFORM

RELATED APPLICATIONS

This application is a continuation of and claims priority under 35 U.S.C. § 120 to U.S. application Ser. No. 16/382,890 filed Apr. 12, 2019, allowed, which is a continuation of and claims priority under 35 U.S.C. § 120 to U.S. application Ser. No. 15/595,794 filed May 15, 2017, and granted as U.S. Pat. No. 10,290,179, which is a continuation of and claims priority under 35 U.S.C. § 120 to U.S. application Ser. No. 14/976,569 filed Dec. 21, 2015, and granted as U.S. Pat. No. 9,649,564, which is a continuation of and claims priority under 35 U.S.C. § 120 to U.S. application Ser. No. 14/212,651 filed Mar. 14, 2014, and granted as U.S. Pat. No. 9,240,101, which is a continuation of and claims priority under 35 U.S.C. § 120 to U.S. application Ser. No. 13/858,581, filed Apr. 8, 2013, and granted as U.S. Pat. No. 8,715,077, which is a continuation-in-part of and claims priority under 35 U.S.C. § 120 to U.S. application Ser. No. 13/569,424, filed on Aug. 8, 2012, and granted as U.S. Pat. No. 8,414,387, the contents of each is hereby incorporated by reference in their entirety.

TECHNICAL FIELD

The subject matter described herein relates to a peer-to-peer software platform that enables dynamic advertising based on gameplay and wagering on online skill based games.

BACKGROUND

An online game is a video game played over a network on some form of computer, mobile device, or on a video game console such as the Xbox 360 and PlayStation 3. This usually means the Internet or equivalent technology, but games can use a wide range of technologies. A recent expansion of online gaming has reflected the overall expansion of computer networks from small local networks to the Internet and the growth of Internet access itself.

Online games can range from simple text based games to mobile games to games incorporating complex graphics and virtual worlds populated by many players simultaneously. Many online games require skill and strategy and have a social aspect beyond single player games. For example, players compete head-to-head, in a tournament, or for the highest score on a leader board. Example categories of online skill-based games include first person shooters, real time strategy games, social games, role-playing games, board games, card games, etc. Due to their social nature, many online games are inherently competitive.

SUMMARY

In one aspect, data characterizing historical skills-based gaming metrics for a first user and historical skills-based gaming metrics for at least one second user is accessed. Using the accessed data and a set of rules, a targeted advertisement to present to the first user is determined. The targeted advertisement specifies at least one skills-based game and a characterization of the at least one second user's historical skills-based gaming metrics. The targeted advertisement is generated. Data characterizing the targeted advertisement is provided.

In another aspect, a digital skills based game is provided to a first user. The skills based game includes display space for displaying at least one advertisement to the user. Using historical skills-based gaming metrics and a set of rules, a targeted advertisement to present to the first user is determined. The targeted advertisement specifies at least one skills-based game and a characterization of at least one second user's historical skills-based gaming metrics. The advertisement display space is modified to include the targeted advertisement. The advertisement prompts the user to, using a peer-to-peer wagering platform, enroll in and place a wager on an online skills based gaming competition. The online skills-based gaming competition is provided to the user.

In yet another aspect, a system includes a third party gaming server, a plurality of third party game instances, and a transactional server. The third party gaming server provides data related to the third party game. The plurality of third party game instances are in communication with and receiving game data from the third party gaming server. Each third party game instance includes a peer-wagering module. The transactional server determines, using historical skills-based gaming metrics and a set of rules, a targeted advertisement to present to a first user. The targeted advertisement specifies at least one skills-based game, and a characterization of at least one second user's historical skills-based gaming metrics. The transactional server generates the targeted advertisement.

One or more of the following features can be included. For example, the advertisement can further specify a proposed wager for the first user in connection with the at least one skills-based game. When to prompt the targeted advertisement to the first user can be determined using the accessed data and the set of rules. Historical skills-based gaming metrics can include game-related attributes from a user's past game plays. Historical skills-based gaming metrics can include game-related attributes from a user's in-progress game or most recent game played. Historical skills-based gaming metrics can include one or more of: game outcome, game score, game level completed, game difficulty, player ratings, average game scores, statistical measure of game outcome, game achievements, top scores across a set of other user's results, completion of in-game objectives, user ranking, in-game character level, in-game character possession of game item, in-game character attribute.

Historical skills-based gaming metrics can be aggregated by tracking a user's game data over a period of time. The first user can provide a peer-to-peer wagering platform that enables the first user to place a wager on an online skills-based gaming competition. Providing can include transmitting, persisting, displaying, and prompting to the user. The set of rules can be customizable by a skills-based game tournament creator. The targeted advertisement can further specify at least one skills-based game tournament. The historical skills-based gaming metrics for the at least one second user can be taken from skills-based game tournaments. The advertisement can further specify a proposed wager for the first user in connection with the at least one skills-based game. When to modify the advertisement display space can be determined using the accessed data and the set of rules.

The transactional server can be configured to generate a pseudo-random number stream for use by at least some of the plurality of third party game instances.

In yet another aspect, a system includes a third party game server, a plurality of third party game instances and a transactional server. The third party game server provides data related to a third party game. Each of the third party game instances is in communication with and receiving game data from the third party gaming server. Additionally, each third party game instances includes a peer-wagering module to receive a wager amount from a player associated with the corresponding third party game instance. Each third party game instance is associated with an online gaming competition and each player is participating in the online gaming competition. The transactional server receives the wager amount from each peer-wagering module. The transactional server secures previously deposited funds associated with each of the associated corresponding players. The fund amount is equal to the respective wager amount. Each server includes at least one computing system having at least one data processor.

In yet another aspect, data characterizing a plurality of players and a wager amount for each player can be received. Each player is enrolled in a third party skills based digital gaming competition. An amount of funds previously deposited by the respective player is secured for each player, using an online skills based digital game wagering platform. The secured funds are equal to the wager amount. The funds can be secured such that they cannot be transferred, withdrawn, or secured for a different wager. Data characterizing a confirmation that each of the plurality of players funds were successfully secured is transmitted.

In yet another aspect, a digital skills based game is provided to a player using a mobile processing device. The skills based game is single player and displays at least one advertisement to the player. The advertisement is modified using historical gaming results of the player. Content of the advertisement includes text, graphics, and linked-destination. The advertisement prompts the player to enroll in and place a wager on an online skills based gaming competition. The online skills based gaming competition is provided to the player.

One or more of the following features can be included. The transactional server can receive game statistics describing the results of the online gaming competition from the third party gaming server and automatically transfer, based on the received game statistics, at least a portion of the secured funds to at least one account associated with at least one of the players. The third party game can be an asynchronous competitive skill based game played between each player. The third party game can be a synchronous competitive skill based game played between each player. The transactional server can send a notification of each player's winnings, losses, score, time, and other game play information to the peer-wagering module in each of the plurality of game instances. The transactional server can determine if the previously deposited funds associated with a player are less than the wager amount. The online gaming competition can be a tournament. The online game competition can be selected from a group consisting of: Massively Multiplayer Online Role Playing Games ("MMORPG"), First Person Shooters ("FPS"), and Real Time Strategy ("RTS") games.

Data characterizing the outcome of the third party skills based gaming competition can be received. At least a portion of the secured funds can be transferred, using the online skills based digital game wagering platform, to an account associated with one of the plurality of players. Data characterizing the transfer can be transmitted. Data characterizing the winnings and losses of one or more of the plurality of players can be transmitted. At least one of the plurality of player's can be rewarded with non-monetary compensation based on the outcome of the third party skills based gaming competition. The non-monetary compensation can be used as a substitute to funds to enter a future online skills based gaming competition. The data characterizing the transfer can be transmitted to a plurality of peer-wagering modules, each module included in an instance of a third party game. The data characterizing the confirmation is transmitted to a plurality of peer-wagering modules, each module included in an instance of a third party game. The data characterizing the outcome of the third party skills gaming competition can be received from a third party game server, the game server providing game data to a plurality of game instances in communication with the game server, each game instance including a peer-wagering module.

The data characterizing the outcome of the third party skills gaming competition can be received from a plurality of peer-wagering modules. Each module can be included in an instance of a third party game in communication with a game server providing game data to the plurality of game instances. The third party skills based gaming competition can be associated with an asynchronous game. The third party skills based gaming competition can be associated with a synchronous game. The wager amount can include a plurality of values. Each value can be associated with one of the plurality of players.

Data characterizing the player's game play can be received. One or more characteristics of the received data can be monitored. The monitored characteristics can be compared to historical characteristics associated with the player to detect fraudulent behavior by the player. Deviations between the monitored characteristics and historical characteristics can indicate fraud. The monitoring can be performed in real time. The monitoring can be performed after the online skills based game competition is complete.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, methods can be implemented by one or more data processors either within a single computing system or distributed among two or more computing systems.

The subject matter described herein provides many advantages. The current subject matter provides a fully integrated set of technologies to facilitate wagering within electronic multiplayer or single-player games of skill. Users can complete a wager conveniently and receive any winnings. Users can track individual winnings and losses and, when placing bets, can be comfortable knowing that the current subject matter places wagered funds in escrow to guarantee payment to the winner(s). Additionally, users can easily create competitions using their favorite online game for friends to join and wager real money on the outcome. Users can also compete against strangers. Furthermore, a software development kit provides game developers with a toolset that is easy to integrate into games. The current subject matter can convert any game of skill into a tournament enabled wagering platform. The current subject matter also enables user-created tournaments.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 5 is an example user interface integrated into a third party game that can present to players browsing public tournaments;

Like reference symbols in the various drawings indicate like elements.

DETAILED DESCRIPTION

Figure 1:
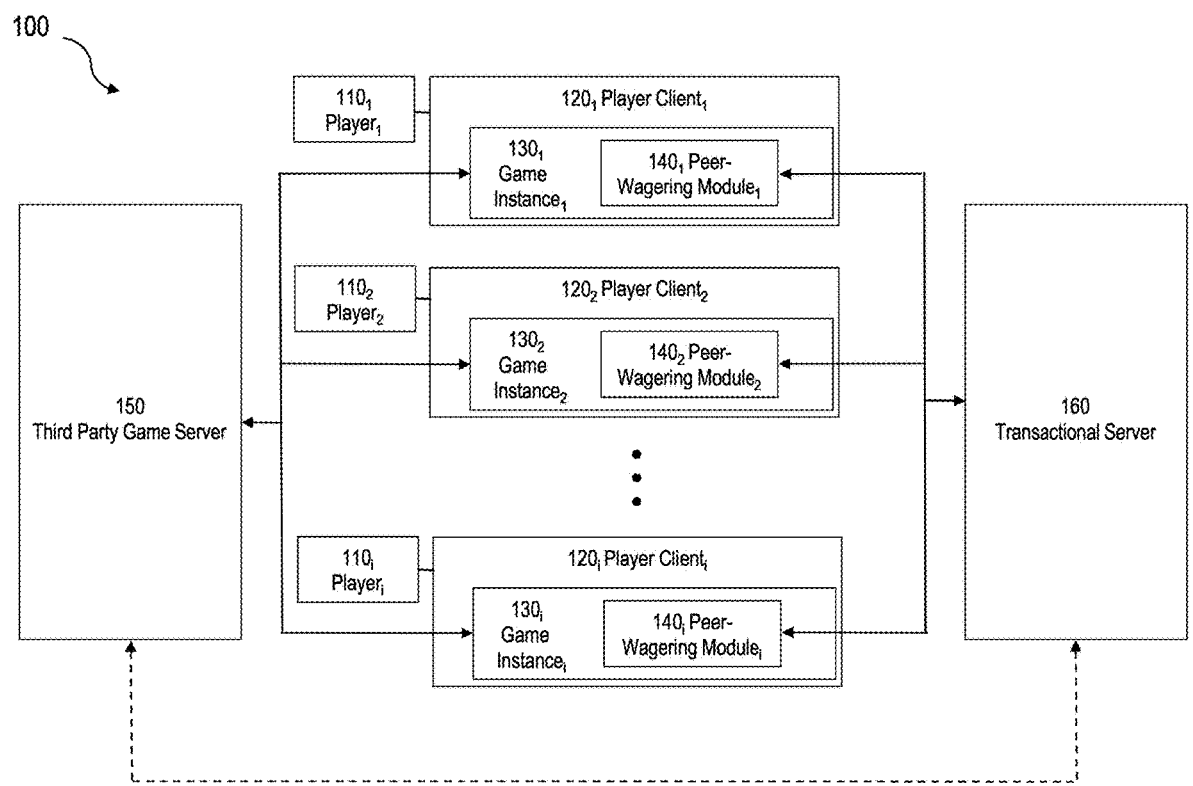
FIG. 1 is a system diagram illustrating a system that facilitates wagering within electronic multiplayer games of skill.

FIG. 1 is a system diagram $100$ illustrating a system that facilitates wagering within electronic multiplayer games of skill. A plurality of players $110_i$ (i=1, 2, . . . , N) operate respective player clients $120_i$. Each player client $120_i$ includes a third party game instance $130_i$. The game instance $130_i$ is any online digital game (e.g., video game) in which player skill determines game outcome, not chance, and wherein multiple players $110_i$ can compete against one another online. Games are consistent across game instances $130_i$ (e.g., if the players $110_i$ are playing chess, each game instance $130_i$ is an instance of an electronic chess game). Each game instance $130_i$ can be in communication with and receiving game data from a third party game server $150$. The game server $150$ provides game data necessary to operate the game. Alternatively, game instances $130_i$ can exchange game data directly.

Each game instance $130_i$ includes a peer-wagering module $140_i$. The peer-wagering module $140_i$ integrates into the game instance $130_i$ and enables the players $110_i$ to wager on the outcome of a given game competition. The peer-wagering module $140_i$ communicates with and works in tandem with a transactional server $160$. The transactional server $160$ maintains account information for each player $110_i$, including financial information, and acts as a trusted party to hold funds in escrow and/or secure funds to enforce the terms of a wager (i.e., ensures winning players receive the winnings).

The transactional server $160$ can also pass data characterizing advertisements (e.g., advertising logic, invitations, and/or messages) to the third party game server $150$. This advertising data can be algorithmically customized based on player $110_i$ historical gaming data or metrics of the gaming data. For example, an advertisement could include or be modified to prompt the player with "you've won four out of five of your last games, click here to play in $5 tournament and take your game play to the next level."

Figure 11:
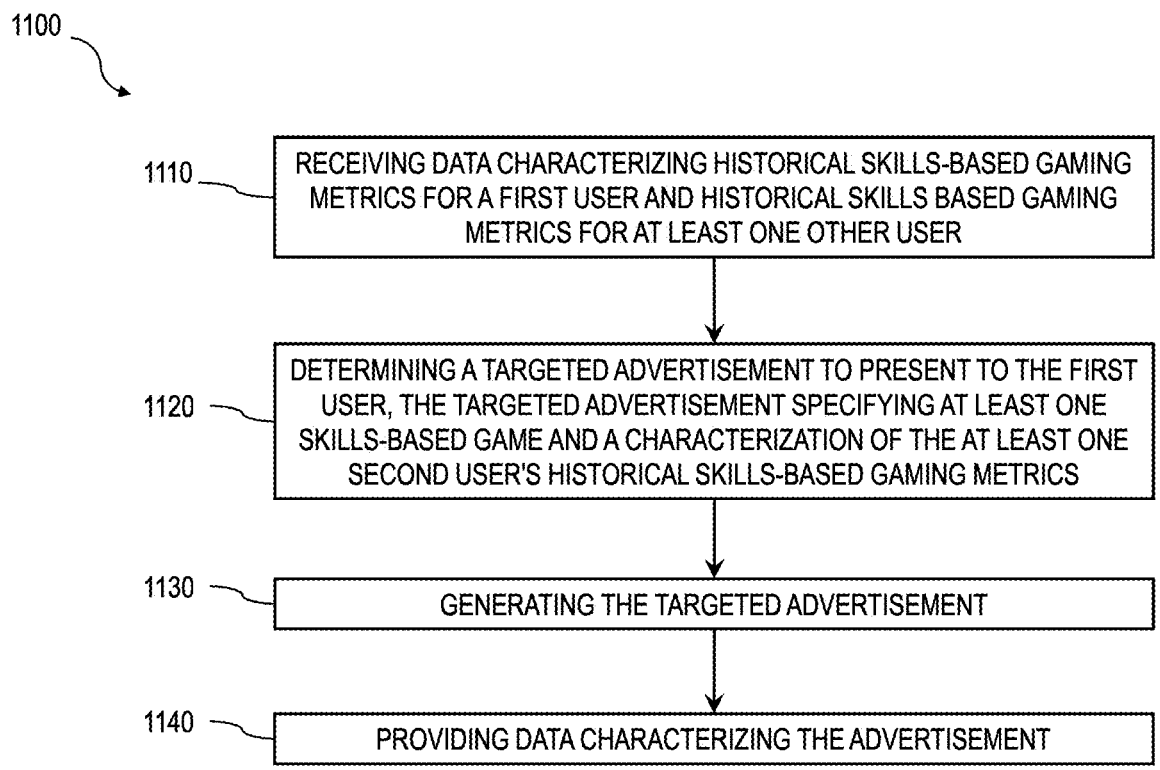
FIG. 11 is a process flow diagram illustrating a method of providing data characterizing a targeted.

FIG. 11 is a process flow diagram $1100$ illustrating a method of advertising to (e.g., inviting) a player (e.g., user) to enroll and participate in an online skills based gaming tournament. Data is received at $1110$ characterizing historical skills-based gaming metrics for a first user and historical skills based gaming metrics for at least one other user. The player can be currently playing or have recently played the game and the player can be playing the game while not being enrolled in an online skills-based gaming competition. A targeted advertisement to present to the first user is determined, using a set of rules, at $1120$. The targeted advertisement specifies at least one skills-based game and a characterization of other user's historical skills-based gaming metrics. The targeted advertisement can entice the player to take a specific action based upon the player's gameplay (e.g., the player is prompted/invited to join a competition). The targeted advertisement can be customized to an individual player. The targeted advertisement is generated at $1130$ and the advertisement is provided at $1140$. Providing can include transmitting, persisting, displaying, and prompting to the player.

The historical skills-based gaming metrics can be supplied by the player client $120_i$, or tracked and/or recorded (e.g., over time) by the transactional server $160$, or the third party gaming server $150$. Historical skills-based gaming metrics can include game attributes that can be traced (e.g., recorded or monitored) and are associated with the player's in-progress, most recent, and/or past game plays. For example, historical skills-based gaming data can include: an in-game score, game outcome, time to complete a stage, game level achieved, difficulty, number of enemies, power-ups acquired, player ratings, number of wins or losses, statistical measures of attributes (e.g., average scores, ratio of wins to losses, etc.), top scores across some or all players, completion of any game related task, objective, and/or achievement, in-game acquisition of items, and/or other character attributes. Historical skills-based gaming metrics can include other traceable game attributes.

When the advertisement is presented to the player and/or the content of the targeted advertisement can be based on configurable messaging rules (i.e., a set of rules). The rules can be used to target players with specific attributes, levels of skill, or relationships. For example, an advertisement or invitation could prompt to a player to join and wager on a tournament based on a player exceeding a certain predetermined value or score for a particular in-game challenge. The rules could include whether the player has completed a particular level, game, number of games played, time played, or other game element. An advertisement could be presented when a player is among a certain percentile of players (e.g., prompting players to enroll in a tournament with like-skilled players).

Additional rule examples can include when a player has wagered, lost, and/or won at least a certain amount (e.g., prompting players to enroll in a tournament that requires "high stakes" or large minimum wagers), when one or more other players associated with the first player (e.g., links on a social networking website) are enrolled in a tournament (e.g., prompting a player to enroll in a tournament with their friends), when a player has played a certain number of games, and/or when a player has completed a level or challenge in a tournament. The messaging rules can also be based on a geographic location of the player (e.g., online wagering regulations may vary based on locality), or whether the player is eligible to wager cash or rewards on a tournament. Administrators, and/or tournament creators can configure or customize the messaging rules.

The targeted advertisement can include graphical, textual, and hyperlink information necessary to populate pre-existing advertising space with a customized invitation for players to wager on a skill based gaming tournament. Targeted advertisements can include customized messages derived or based on the messaging rules and/or other data triggered by a rule, gameplay, or historical skills-based gameplay metrics. The targeted advertisement can be targeted to the player and include a characterization of the player's historical skills-based gaming metrics and a characterization of one or more other player's historical skills-based gaming metrics. For example, the targeted advertisement can include information regarding how many active games are being played for a given game or a different game. The advertisement can include a message regarding how many of the player's friends, contacts, or in-network users are active in the system. The advertisement content can show how a player would fare if they joined a tournament or played a different game by including a comparison between or characterization of the historical gaming data and other players in the system (e.g., showing how much money the player would have won in a real tournament, a comparison of the player's average score to other player's average scores, a mock leader board where the game player is compared to all players of the game, etc.). The targeted advertisement could include a proposed wager amount for the first player.

Figure 12:
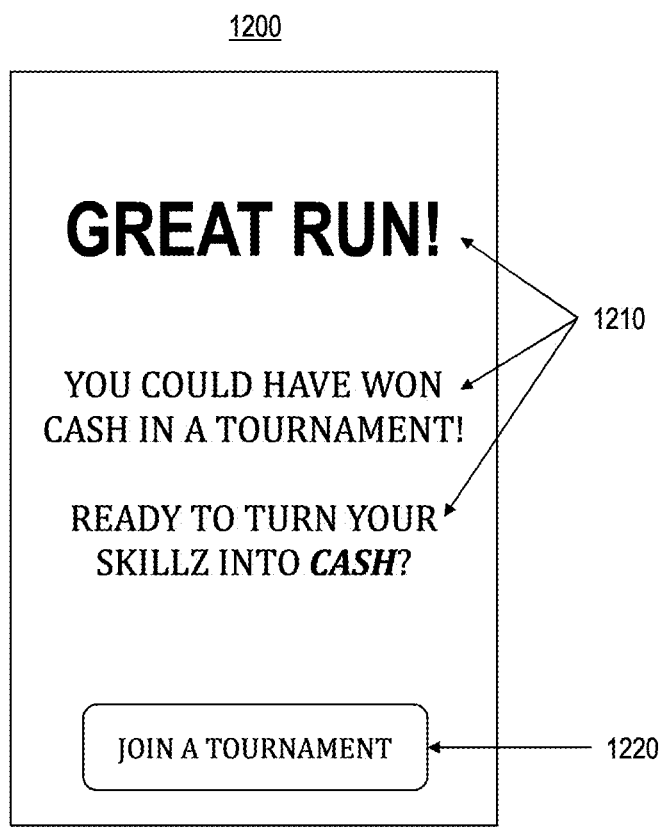
FIG. 12 is an example advertisement.

FIG. 12 is an example advertisement 1200 presented to a player after the player satisfied a message rule (e.g., had a high score). The advertisement includes text 1210, including a characterization of other player's historical skills-based gaming metrics, and a button 1220 (i.e., link) to redirect the player to enable the player to enroll and wager on a tournament. The advertisement could further includes graphics and be embedded in the game user interface.

Figure 10:
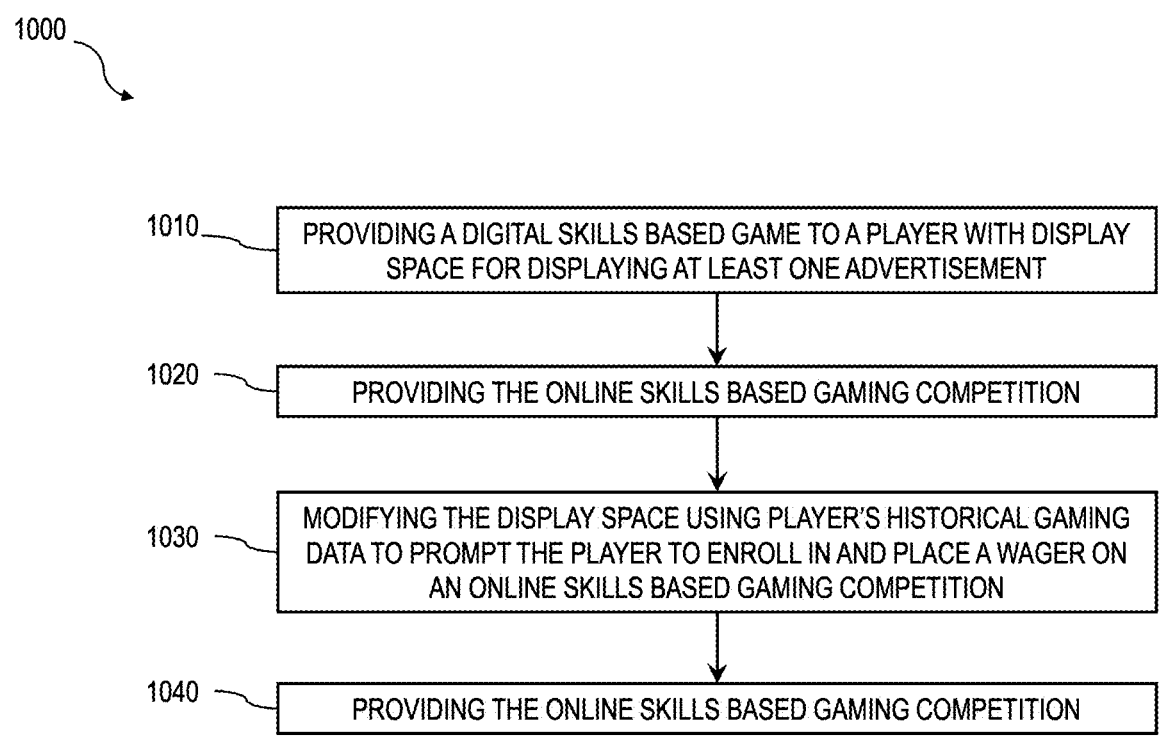
FIG. 10 is a process flow diagram illustrating a method of advertising an online skills based competition.

FIG. 10 is a process flow diagram 1000 illustrating a method of advertising an online skills based competition. At 1010, a digital skills based game is provided to a player (i.e., user). The game contains display space for displaying advertisements. At 1020, a targeted advertisement to present to the first user is determined using historical skills-based gaming metrics and a set of rules. The targeted advertisement specifies at least one skills-based game, and a characterization of at least one second user's historical skills-based gaming metrics. The advertisement display space is modified at 1030 using the player's historical gaming data to prompt the player to use a peer-to-peer wagering platform to enroll in and place a wager on an online skills based gaming competition. At 1040, the online skills based gaming competition is provided to the player.

By utilizing specific player's historical gaming data and messaging rules, the advertisements/messages can be customized to the player and each advertisement has a higher likelihood of enticing the player than a non-customized (e.g., a general) advertisement.

Referring again to FIG. 1, players $110_i$ can register and fund accounts either directly with the transactional server 160 (for example, accessing the server via a web browser) or through the peer-wagering module $140_i$. The players $110_i$ can fund their account through several means, such as, for example: PayPal, credit cards, Automated Clearing House (ACH) transfer, cash, loyalty cards, pre-paid cards, coupons, system credit, credit earned by watching advertisements, Google checkout, etc. Other methods of funding the account are possible.

Players $110_i$ can create tournaments. Prior to game play, the peer-wagering module $140_i$ can receive credential information from the player $110_i$, send the credentials to the transactional server 160, which can authenticate the credentials. Authentication can include age and location controls to ensure local law compliance. Age can be entered by the player $110_i$ and location can be verified by any of a billing address used to fund an account, the GPS location of a mobile device (if available), and an IP address of the player client $120_i$. When each player $110_i$ enrolls in a tournament, including placing a wager on the tournament (e.g., paying a tournament entry fee), the transactional server 160 can secure the player $110_i$ funds. Secured funds cannot be withdrawn or used for another wager. Securing the funds can include transferring the funds from the player account to an escrow account as well as placing a "hold" on the funds in the player's account.

Once the transactional server 160 secures funds from all participating players $110_i$, the tournament can proceed. The tournament proceeds under normal game mechanics (such as each game instance $130_i$ communicating game data with the game server 150) until game play completes. The transactional server 160 receives completed game statistics from the game server 150 or, alternatively, from each peer-wagering module $140_i$. The game statistics can indicate winners and losers based on one or more in-game metrics. A player $110_i$ can also determine one or more custom in-game metrics to be used in determining winners and losers during tournament initialization. The transactional server 160 transfers the previously secured funds to one or more player $110_i$ accounts based on the game statistics. For example, a winning player can have the player's winnings transferred from the other players' accounts or the secure escrow account into the winning player's account. The transactional server 160 sends financial data related to winnings and losses to each peer-wagering module $140_i$, which provides the financial data to the players $110_i$. Additionally, the transactional server 160 can send the game statistics to each peer-wagering module $140_i$, which provides the game statistics to the player $110_i$.

Game statistics sent to the transactional server 160 from either the game server 150 or from each peer-wagering module $140_i$ can include summary level statistics such as winners and losers and/or specific in game actions such as player orientation within the gaming environment, player actions (e.g. buttons pressed or character movement), or user display details. The user display details can include, but are not limited to, graphics card-information, in-game screen shots and live action game-play. These statistics can be used to determine system level player-rewards that are independent from tournament outcomes as well as in the detection of fraudulent behavior through any of the following: real-time tournament monitoring, delayed tournament review, or statistical player review for idiosyncratic behavior or behavior characteristic of fraudulent play.

The peer-wagering module $140_i$ provides necessary user interface components and player $110_i$ to transactional server 160 interaction functionality for the game instance $130_i$. This provides a low barrier for third party game providers to enable the peer-wagering functionality into the game. The peer-wagering module can be implemented with platform specific software development kits (SDKs).

Communication can occur over any suitable communications network, such as, for example, the internet.

Figure 2:
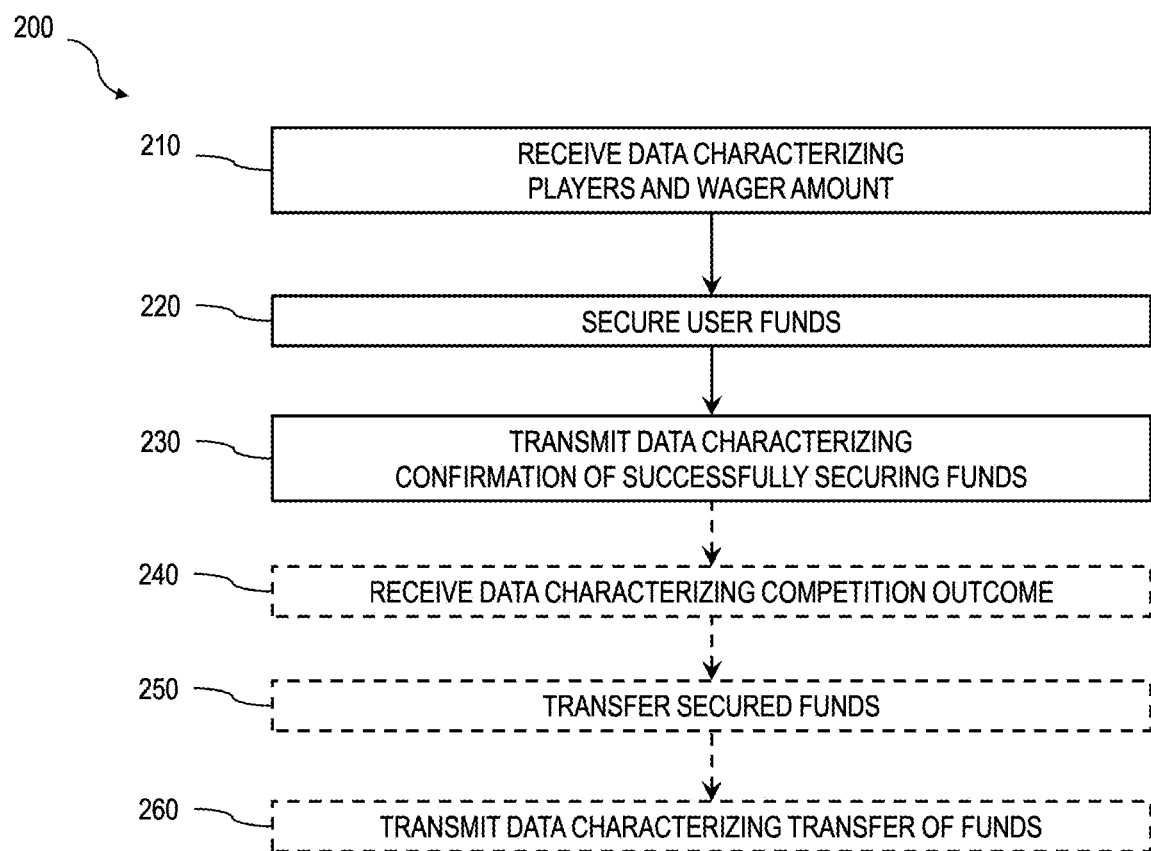
FIG. 2 is a process flow diagram illustrating a method of facilitating wagering within electronic multiplayer games of skill.

FIG. 2 is a process flow diagram 200 illustrating a method of facilitating wagering within electronic multiplayer games of skill. At 210, the transactional server 160 receives data characterizing each player and each player's wager amount. The wager amount can be variable among the players or fixed among the players. Optionally the players may be matched in tournaments with players wagering similar amounts. Each player has enrolled in a third party skills based gaming competition (e.g., a tournament). At 220, the transactional server 160 secures, for each player and using a respective player account, funds equal to the corresponding received wager amount. The players have previously registered the player account and deposited funds in the account. The transactional server 160 can place the funds in an escrow account until the completion of the gaming competition. Alternatively, the transactional server 160 can secure the funds by placing a "hold" on the funds in the players' accounts preventing withdrawal or use of the funds. At 230, the transactional server 160 transmits data characterizing a confirmation that the transactional server 160 has successfully secured funds from each enrolled player. If funds as to a player are not available in the respective player account, the transactional server 160 can send data to prompt the player to deposit additional funds into the player's account.

Optionally, at 240, the transactional server 160 receives data characterizing the outcome of the competition. The data can include in-game statistics and indicate that some of the enrolled players are winners and some are losers. Alternatively, the transactional server 160 can differentiate, based on the in-game statistics, players that are winners and players that are losers. The transactional server 160 can determine based on the in-game statistics the amount of secured funds (if any) to which enrolled players are entitled. Optionally, at 250, the transactional server 160 can transfer at least a portion of the secured funds to one or more accounts associated with their respective enrolled players. Optionally, at 260, the transactional server 160 can transmit data characterizing the transfer and/or the in-game statistics. The transactional server 160 can receive the respective data from and transmit the respective data to one or more of the peer-wagering module $140_i$ and the third party game server 150.

The game can be asynchronous. Asynchronous games cover any turn-based game where players $110_i$ take turns and real-time game play is not an issue. A player $110_i$ may leave the game to perform other tasks on the same device on which the game is running, without forfeiting a tournament. Asynchronous games can include games such as Chess, Checkers, Go, and most board games where timing of player turns is not a consideration.

The game can be synchronous. Synchronous games cover any game where real time interaction between the game and player or between players is required. For example, first person simulations wherein each player has one or more characters (i.e. avatars) and multiple players' characters are interacting in real time with each other's characters or game environment in a synchronized way. First person shooters, driving and racing simulators as well as real time sports simulations are synchronous. Some turn-based game designs can also include synchronous aspects if all players must be present at some times while a game is in progress.

Whether synchronous or asynchronous, an entire level of a can game constitute a turn, and the players can take turns independently. For example, games such as Angry Birds, where two or more players can complete a level, independently but potentially at the same time, and the winner can be determined based on some metric when all players complete the level. In this manner, an entire level constitutes a player turn.

The transactional server 160 can provide an application-programming interface (API) for the third party game instances $130_i$ or the third party game server 150 to communicate with the transactional server 160.

Establishing tournaments can allow players $110_i$ to compete with one another within skill-based games in a single or series of contests. Tournaments can work with synchronous and asynchronous play modes, and tournaments can be user or system generated. Tournaments can be either public or private. Public tournaments can be open to any registered player while private tournaments can be open only to invited players. Any tournament must necessarily have at least two participants. Player-created tournaments can require a specific number of entrants in order to begin the competition, whereas system-created tournaments can have a fixed or variable number of permitted and/or required entrants. Tournaments with a variable number of participants can have a fixed starting time and can have a maximum number of allowed entrants.

Tournaments can comprise a single match or a series of matches (i.e., multi-round tournaments). The structure can be determined at the time of tournament creation. Each match can have a specified number of participants and winners. A specific win-metric can determine the winners of each match. Individual tournament rounds (e.g., matches) can begin at a pre-determined time set up by the creator of the tournament or they can proceed in immediate sequence. Matches not completed by the next designated match time slot can be terminated, and the top contenders from each non-concluded match can be rewarded the win for that match.

Each tournament or tournament round can have defined criteria by which the winner(s) are determined. Possible win-metrics can be dependent on the type of game, but can include (for example): highest score, first to complete a level, least moves to complete a level, etc. Additionally, each tournament can have an entry fee which is a dollar amount required to enter the tournament (i.e., a wager amount). However, some system-created tournaments can waive this fee for some or all players $110_i$. The tournament creator can determine the amount of the entry fee.

Prizes offered to tournament winner(s) can be determined at the time of tournament creation. Prize information can be visible to all prospective tournament entrants. In the case of user-created tournaments, the player creating the tournament can set the total prize pool automatically. For example, the creating player can set the prize pool based on the number of entrants and the entry fee that the creating player has specified. The creating player can allocate prizes in a variety of ways such as awarding prizes to more than one participant in a given tournament. A tournament creator can specify the number of winners and the percentage allocation of prizes to each of those winners. A public tournament creator can base prize distribution on individual performance relative to the defined win-metric; however, a private tournament creator can incorporate team scoring relative to the win-metric in determining prize allocation.

An example player $110_i$ interaction with an asynchronous multiplayer game including the current subject matter includes creating a tournament, joining a tournament, and concluding a tournament. To create a tournament, the player $110_i$, using the player client $120_i$, launches a third party game instance $130_i$. The player can choose within the game to compete using the peer-wagering module $140_i$. The user can log into their transactional server 160 account, optionally electing to remain logged in to the account within this session and future session of this game.

Figure 3:
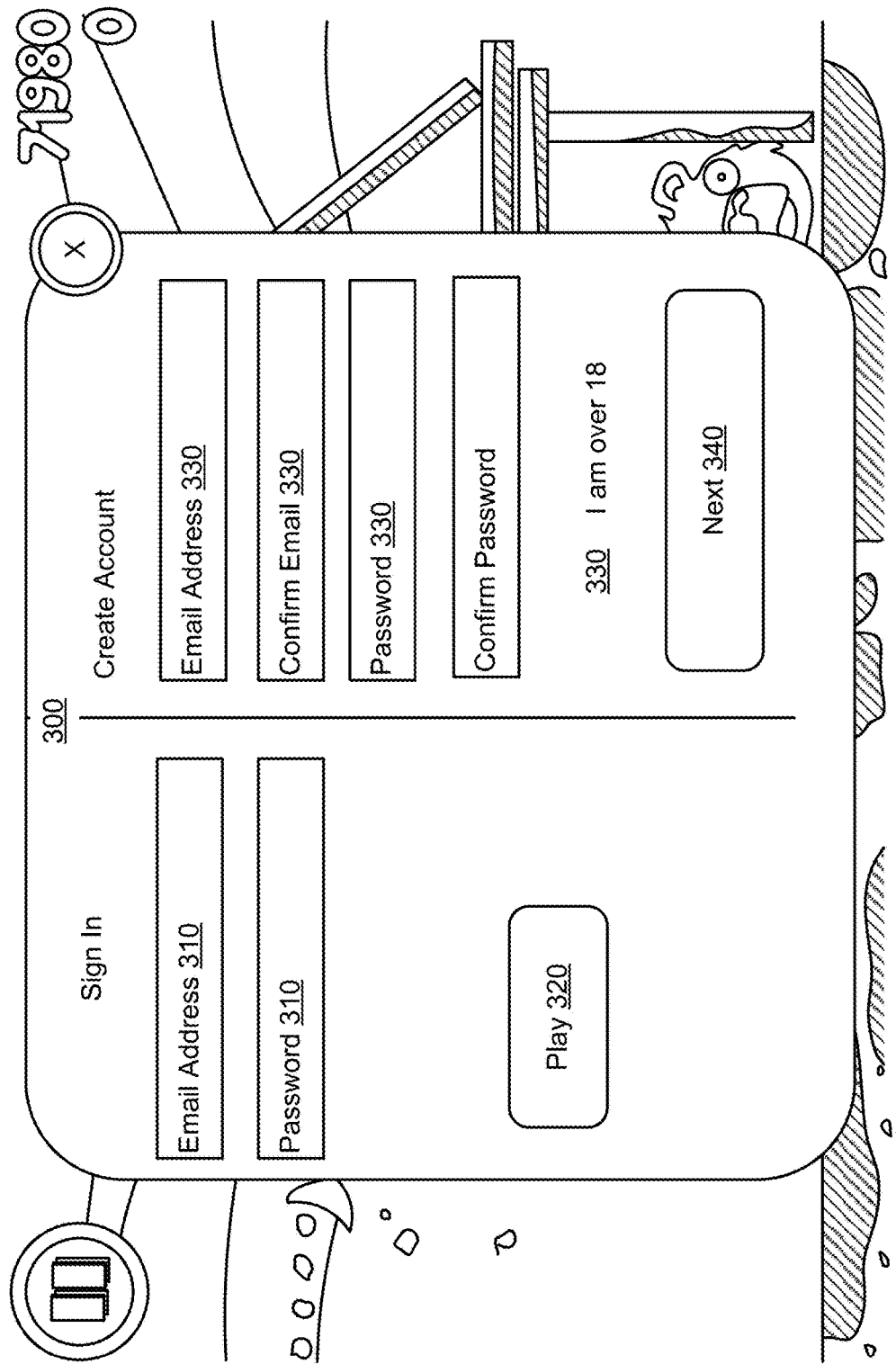
FIG. 3 is an example user interface integrated into a third party game that can present to the players for signing into or registering their account.

FIG. 3 is an example user interface 300 integrated into a third party game that can present to the player for signing into or registering their account. At 310, the player $110_i$ can enter credential information such as an email address and password. At 320, the player $110_i$ can sign in using the play button 320.

Once signed into their account, the player $110_i$ can create a public or private tournament and set parameters for the tournament. The transactional server 160 can prompt the player to add funds to their account if the player $110_i$ has inadequate funding. The player $110_i$ can invite several known players using their account names (e.g., email addresses, user names, etc.). If the tournament is a public tournament, uninvited participants can join. Public tournaments can start on a rolling basis with players taking their first turn as soon as they join the tournament or as soon as the player before them has played (depending on game mechanics). Private tournaments start when the prescribed number of participants has entered the tournament. The game proceeds according to the game developer's prescribed game mechanics.

Figure 4:
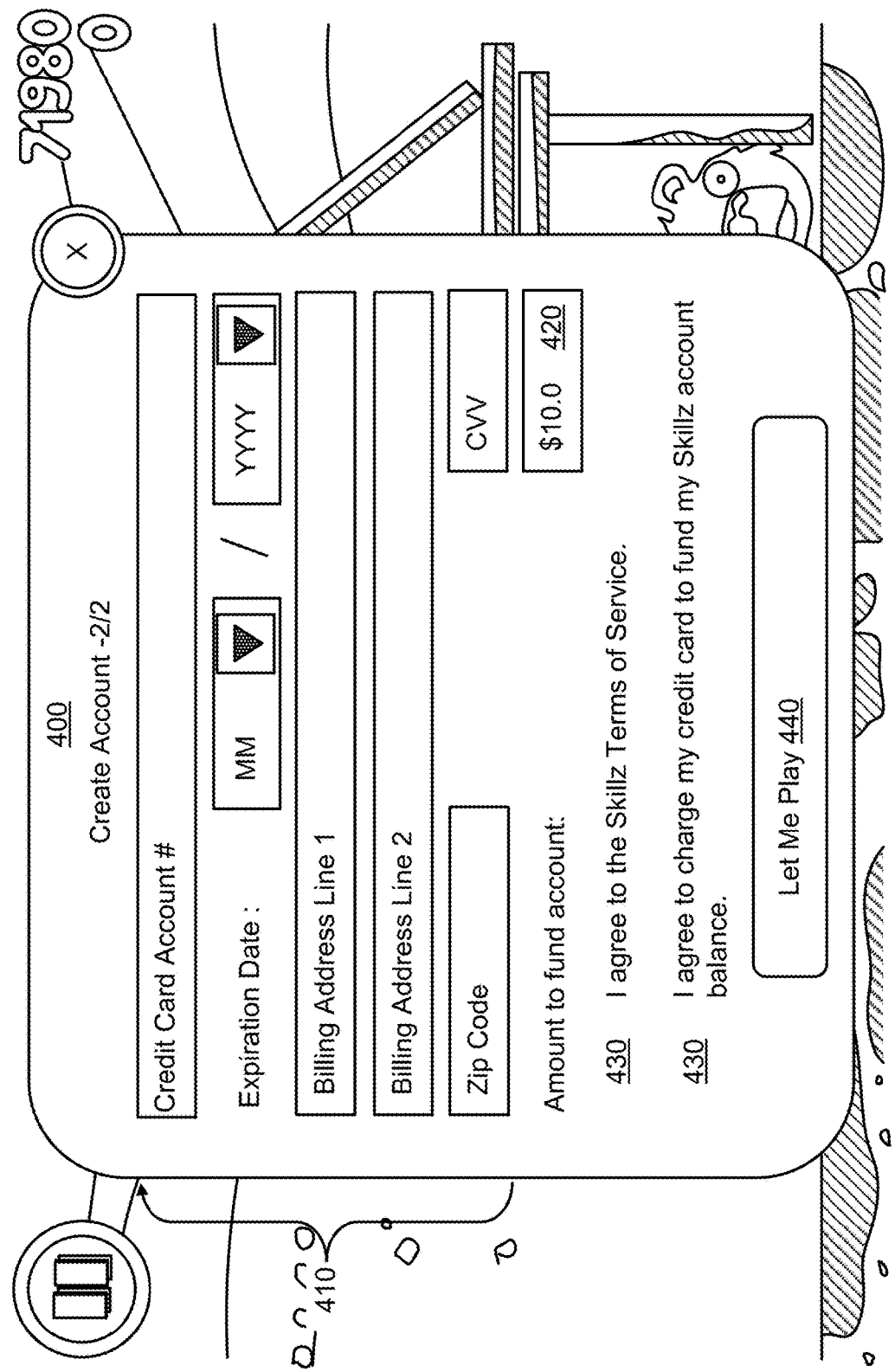
FIG. 4 is an example user interface integrated into a third party game that presents to players for registering their accounts.

If the player $110_i$ does not yet have an account, the player $110_i$ can register for an account by entering information such as email address and password in data fields 330 and pressing the next button 340. FIG. 4 is an example user interface 400 integrated into a third party game that presents to the player $110_i$ for registering their account. The player $110_i$ can enter at 410 credit card information and billing address and specify at 420 an amount to charge the credit card. The player $110_i$ can select checkboxes 430 to agree to the terms of service and confirm payment. The player $110_i$ can complete the registration using push button 440. The player $110_i$ can enter additional account information (not shown) such as full name, age, phone/mobile number (for SMS notification of game events), and an account name that will be visible to other players $110_i$.

To join a tournament, a player $110_i$ can receive a notification inviting them to a tournament. Notifications can arrive via any one of several means. For example, push notifications, SMS, email and in-game notifications are all options for notification. Alternatively, the user browses public tournaments that are seeking players and selects one. The player $110_i$ launches the game via the notification they have received or proceeds into the game after selecting a public tournament. The player $110_i$ accepts the terms of the tournament, including the funding requirements of the tournament in response to a prompt. If the player $110_i$ has inadequate funding in their account, they can add funds. The player $110_i$ can accept the terms of the tournament and enter the game. The game proceeds according to the game developer's prescribed game mechanics.

In the case when the multiplayer game is synchronous, all players $110_i$ must start the game simultaneously. To provide this functionality, the transactional server 160 presents the players $110_i$ with a tournament lobby while they wait for the synchronous game tournament to begin. The transactional server 160 provides the lobby for both the player $110_i$ who created the tournament as well as the players $110_i$ who join the tournament. The players can see the other players as they join the tournament and can have the opportunity to withdraw from the tournament before the tournament begins. The game can begin a predetermine length of time (e.g., 60 seconds) after all players have joined the tournament. Any withdrawal by the players $110_i$ after this point constitutes forfeiture of the tournament entry fee (i.e. the wager).

The tournament can also start at a predetermined time independent of the number of players $110_i$ in the lobby. Players $110_i$ can sign-up for the tournament in advance of the tournament start time. Once players $110_i$ have signed-up for a tournament, the transactional server 160 can alert the players $110_i$ that the tournament is starting soon through a variety of methods such as email, SMS, in-game alert, etc.

FIG. 5 is an example user interface 500 integrated into a third party game that can present to a player $110_i$ browsing public tournaments that are seeking players. Pending tournament list 510 presents several public tournaments and details regarding those tournaments. For example, the first tournament on the list 520 shows a summary of the tournament settings. The tournament 520 name is "James Game," the type of tournament is "highest score," there are currently ten entrants with a maximum of twelve as shown under number of players. For this example tournament, the wager or entry amount is one dollar and the total prize or payout is ten dollars. The time left shows when the example tournament 520 will start.

Detailed information 530 provides tournament information for a selected tournament and shows the name, type, number of players and maximum players, entry fee, and prize breakdown. In this example tournament, the top three players $110_i$ will receive winnings. Player list 540 provides each player name and overall score currently entered in the tournament. Push buttons 550 enables the player $110_i$ to enter or not enter the tournament.

At the conclusion of a tournament, the normal game mechanics are complete and the third party game server 150 posts data to the transactional server 160 indicating game results. Each player $110_i$ who completes the game should see game results immediately, including data from the transactional server 160 detailing their winnings or losses for the tournament. Other players $110_i$ in the tournament can also receive a notification detailing their winnings or losses from the transactional server 160 and indicating that their tournament is complete. For games where a continuous connection to the service is important to game-play or game integrity, any player $110_i$ who drops off the service and does not re-connect within a certain predetermined period forfeits the game. Third party game developers can determine the period or can optionally include reconnection logic to re-establish a lost connection between players when such a loss of connection cannot be used to gain an advantage in either game-play or waging. Additionally, players may be required to take their turn or take another specified in-game action within a predetermined amount of time. Players who do not act within this set amount of time, as determined by third party game developers, will forfeit the game. The peer-wagering module $140_i$ can report to the transactional server 160 when the player $110_i$ disconnects from the competition or when the player $110_i$ has not taken his turn within the allotted time.

Figure 6:
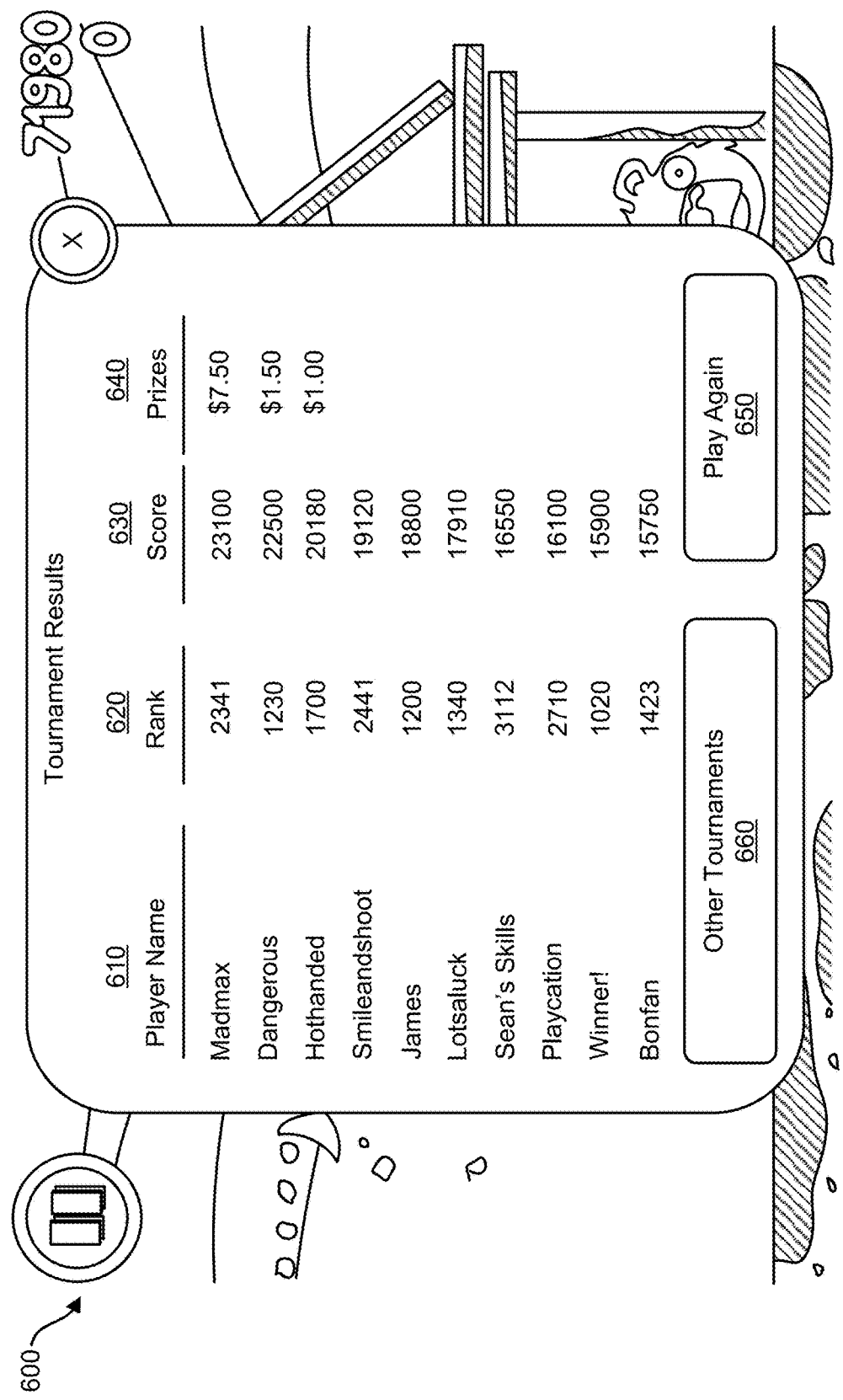
FIG. 6 is an example user interface integrated into a third party game that presents to the players and shows game statistics and results.

FIG. 6 is an example user interface 600 integrated into a third party game that presents to the player $110_i$ and shows the game statistics and results (e.g., a leader board). Column 610 lists each tournament participants account name. Column 620 displays each participating player's in-game rank and column 630 displays each participating player's in game score. Column 640 displays any prizes won by the corresponding player. In this example result, the top three players received funds. At 650 the player $110_i$ can launch the game again and re-enter a new tournament with the same settings (e.g., same wager amount, win metric, invite list, etc.). At 660, the player $110_i$ can go to a tournament selection screen.

Figure 7:
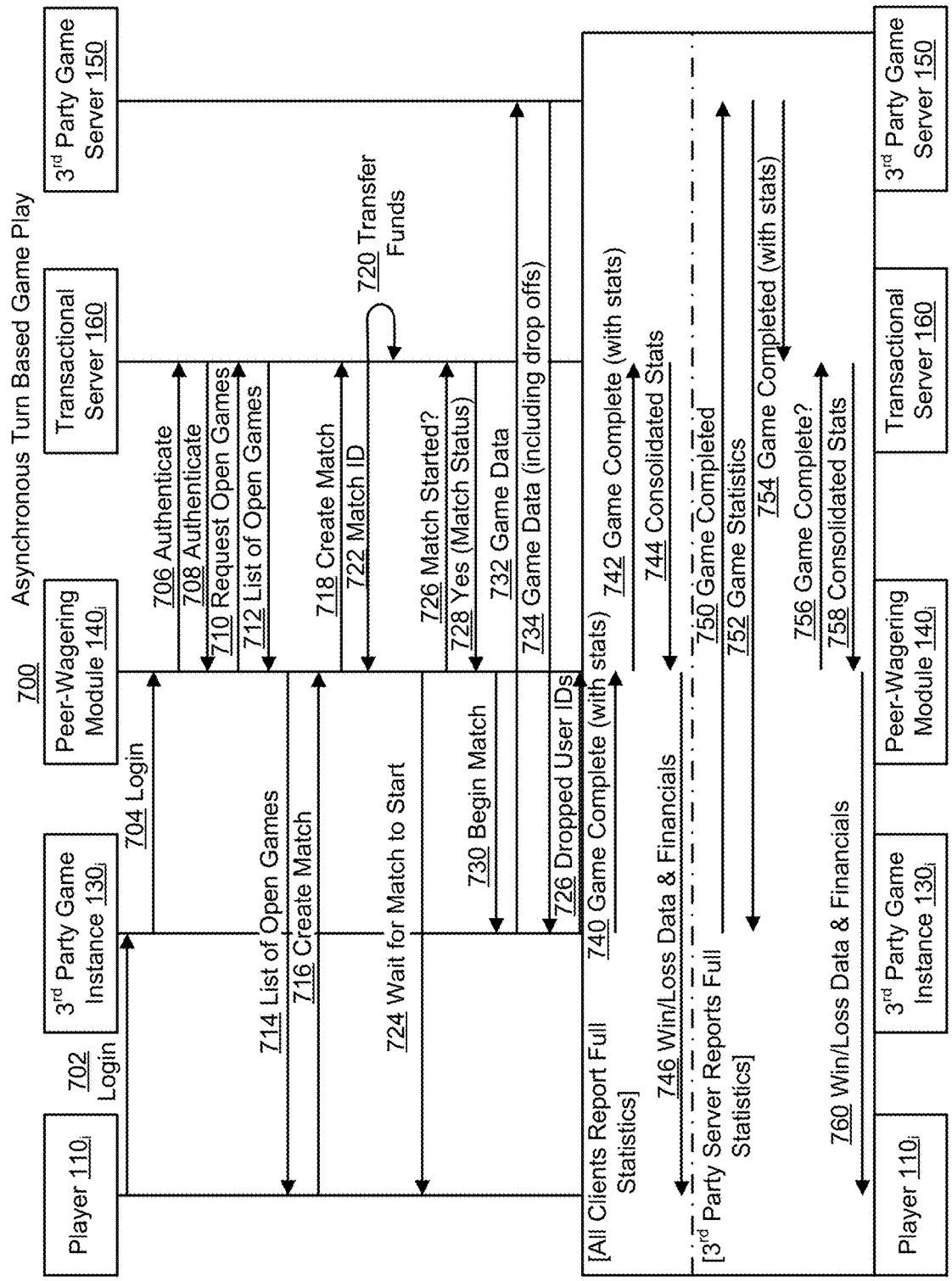
FIG. 7 is a data flow diagram illustrating data communication flow for an asynchronous turn based game.

FIG. 7 is a data flow diagram 700 illustrating data communication flows between an example implementation of the elements of FIG. 1 for an asynchronous turn based game. Elements of FIG. 1 are shown across the top and bottom of FIG. 7, specifically, player $110_i$ (operating player client $120_i$), third party game instance $130_i$, peer-wagering module $140_i$, transactional server 160, and third party gaming server 150.

At 702 through 708 the player $110_i$ logs into the transactional server 160 using the interface provided by the peer-wagering module $140_i$ embedded in the game instance $130_i$. The peer-wagering module $140_i$ authenticates 706 with the transaction server 160 allowing for further messaging between the peer-wagering module $140_i$ and the transaction server 160, via authentication tokens, security certificates, or other user/password exchanges 708. All future requests are set with the valid authentication method. Peer-wagering module $140_i$ requests 710 a list of potential gaming opponents for the logged in player for the currently running game. The transactional server 160 and peer-wagering module $140_i$ returns (712 and 714) a list of the players available for play as well as a list of current tournaments requiring additional players. The creating player $110_i$ creates a tournament 716 and invites other players $110_j$. The peer-wagering module $140_i$ sends 718 the transactional server 160 data regarding invited players $110_j$ and the tournament name. When a player $110_j$ joins the tournament, the player's information is communicated to the peer-wagering module $140_i$ as well. Funds are transferred 720 from the joining/creating player's transactional server 160 account. The transactional server 160 places these funds in escrow or places a "hold" on wagered funds in player accounts. The transactional server 160 returns 722 a unique tournament ID and all entered players $110_i$ wait 724 for the tournament to start. Each peer-wagering module $140_i$ communicates with 726 the transactional server 160 with the tournament ID until the server indicates 728 the tournament has started. The peer-wagering module $140_i$ can signal the transactional server 160 to force the tournament to start for those players who have joined.

During normal game play, all communication (732 and 734) occurs between the third party game instance $130_i$ and its own third party game server 150. All active gaming statistics including rank of each player is communicated and coordinated between the game instance $130_i$ and the gaming server 150. The third party game instance $130_i$ communicates 736 data regarding any players $110_j$ who have left the game or any data relevant to the detection of fraudulent behavior.

On completion of the game, each connected peer-wagering modules $140_i$ send (740 and 742) tournament statistics to the transactional server 160. The transactional server 160 calculates winnings and losses based on the tournament statistics. The transactional server 160 sends (744 and 746) notifications to all players in the completed tournament indicating their tournament has completed, and they have winnings or losses, as well as a leader board for the tournament. The players $110_i$ receiving the completion notification can launch a new game via the notification.

Alternatively, on completion of the game 750, the third party game server 150 sends 752 games statistics to the third party game $130_i$ and sends 754 tournament statistics to the transactional server 160. Each peer-wagering module $140_i$ polls 756 the transactional server 160. The transactional server 160 sends (758 and 760) a leader board for the tournament, as well as notifications to all players in the completed tournament indicating their tournament has completed, and indicating whether they have winnings or losses. The players $110_i$ receiving the completion notification can launch a new game via the notification.

The data flow diagram of FIG. 7 corresponds to an asynchronous turn based game; however, appropriate modification can be performed for synchronous based game play.

Figure 8:
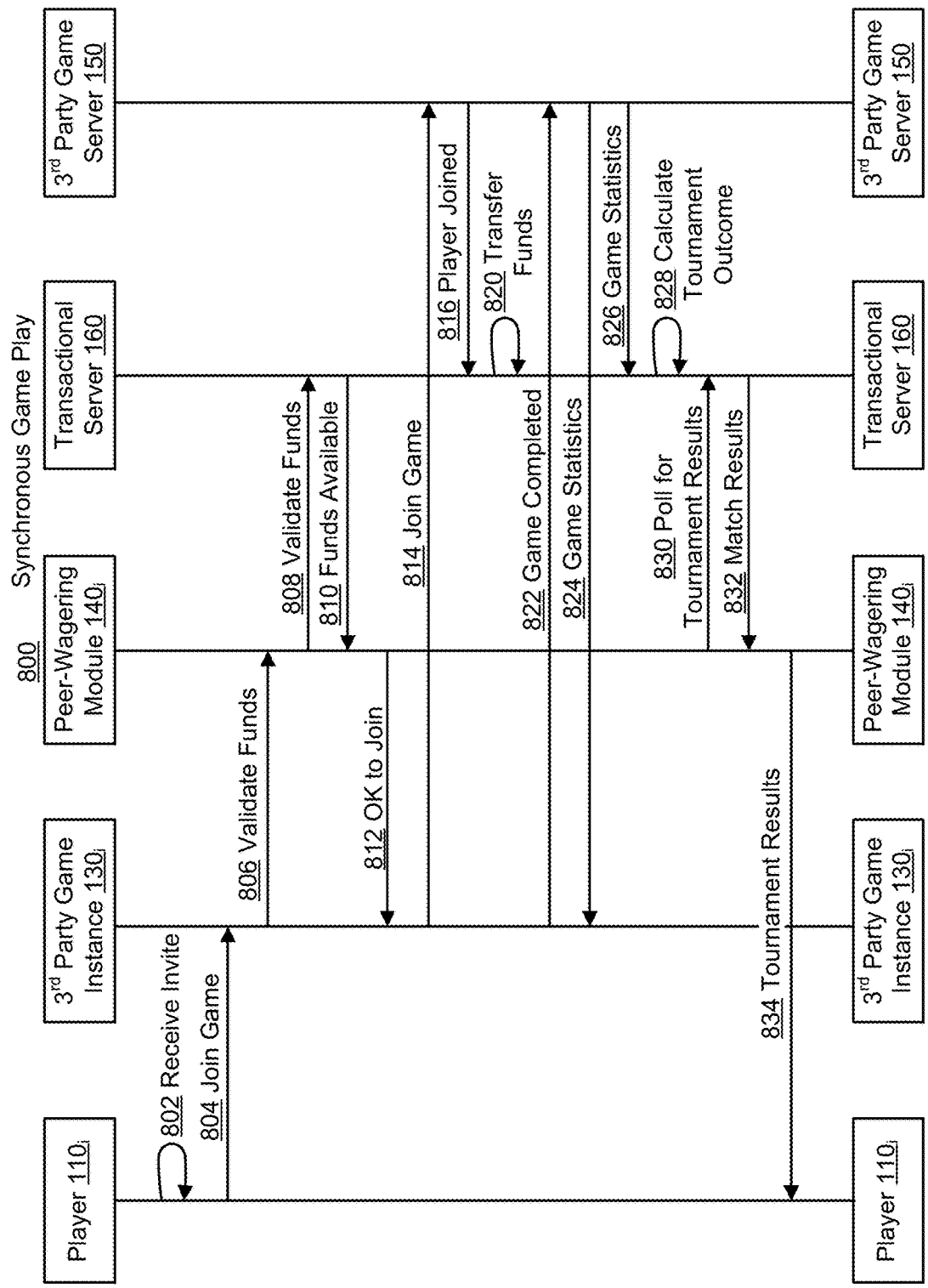
FIG. 8 is a data flow diagram illustrating data communication flow when a player joins a game tournament.

FIG. 8 is a data flow diagram 800 illustrating the data communication flows between an example implementation of the elements of FIG. 1 for a player $110_i$ joining a game tournament. At 802, player $110_i$ receives a notification or in-game message and joins 804 the tournaments. If the player joins an existing tournament through the lobby system, there will be a standard chat window enabled. The transactional server 160 will validate (806 and 808) the funds and inform (810 and 812) the third party game instance $130_i$ that it is ok for the player $110_i$ to join the tournament. At 814 and 816, the player joins the tournament. The transactional server 160 transfers 820 wagered funds to an escrow account or places a "hold" on wagered funds in player accounts. During normal game play, all game-related communication occurs between the third party game instance $130_i$ and the third party game server 150. In some instances during game play, the third party game instance $130_i$ or the third party game server 150 may report 826 game statistics relevant to fraud detection to the transactional server 150.

Figure 9:
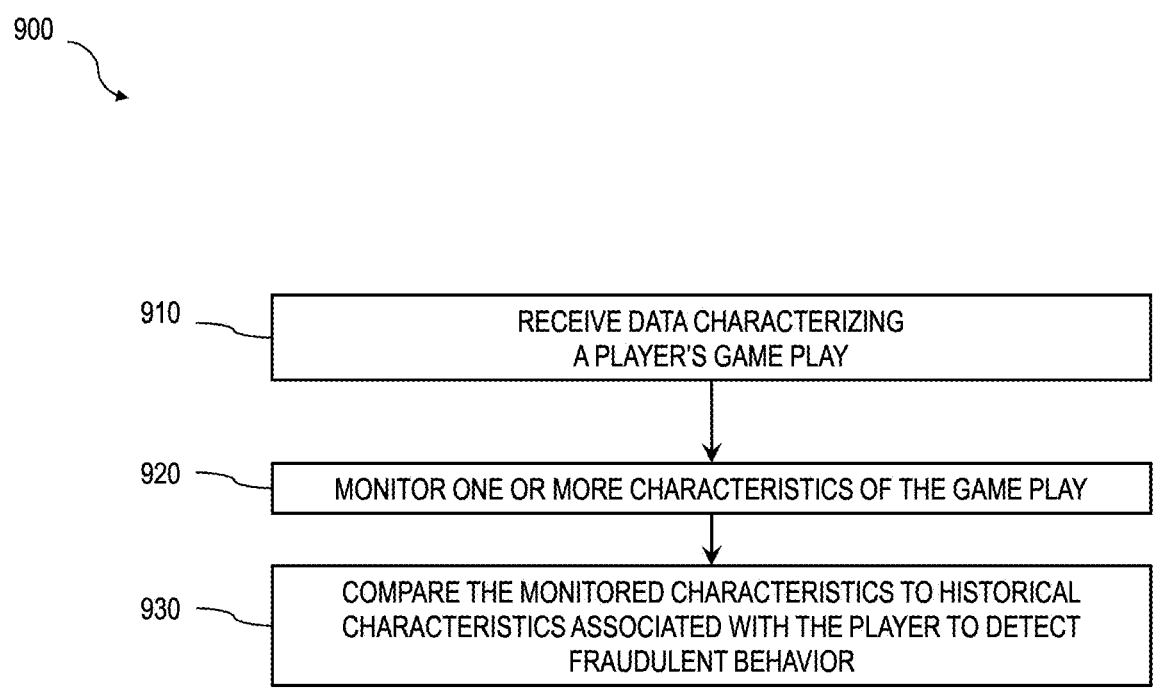
FIG. 9 is a process flow diagram illustrating a method of detecting fraudulent behavior.

FIG. 9 is a process flow diagram 900 illustrating a method of detecting fraudulent behavior. At 910, data is received characterizing a player's game play. At 920, characteristics or attributes of the game play can be monitored and, at 930, the monitored characteristics can be compared to historical characteristics associated with the player to detect fraudulent behavior. Deviations in the game play characteristics from the historical characteristics can indicate fraudulent behavior. Fraudulent behavior can include cheating (i.e., not playing by the game rules and thereby gaining an unfair advantage). These statistics may include specific in-game actions such as player orientation within the gaming environment, player actions (e.g. buttons pressed or character movement), or user display details including, but not limited to, graphics card-information, in-game screen shots and live action game-play. Referring again to FIG. 8, on completion of the game, the third party game server 150 posts 824 game statistics to the third party game instance $130_i$ and posts 826 game statistics to the transactional server 160. The transactional server 160 calculates 828 winnings and losses based on the game statistics. Each peer-wagering module $140_i$ polls 830 the transactional server 160 for match results and receives 832 the match results including a list of winnings and losses, as well as a leader board for the tournament. Each peer-wagering module $140_i$ notifies 834 their respective player $110_i$ that the tournament has completed and they have either winnings or losses. The players $110_i$ receiving the completion notification can launch a new game via the notification.

The transactional server 160 can further be configured to generate a stream of pseudo-random numbers for use by the third party game instances. Since random numbers are typically used in gameplay engines to decide game elements and properties (e.g., what obstacles are present can be decided based on the value that a random number generator returns), the use of common random numbers can provide a common gameplay experience to a subset of users (e.g., the players involved in a third party game tournament). The common gameplay experience can be used to standardize (or level the playing field) for a game of skill that still has random elements.

For example, while Tetris is typically considered a game of skill, the order in which the Tetris pieces present to a player is normally random. By providing a common stream of pseudo-random numbers to each game instance participating in an online tournament, the order that Tetris pieces appear to each player can be common across all participating game instances. Thus, the results of a competitive tournament would be based entirely on skill, and not on a random chance of getting an easier order of Tetris pieces presented.

In one example, the transactional server 160 can use a tournament identification number as a seed to generate pseudo-random numbers, thus causing gameplay to be different between tournaments, but not between game instances involved in a given tournament.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method, comprising:
   receiving, at a client device including a game instance, at least one pseudo random number seed characterized by a unique match identifier for one of a plurality of digital gaming competitions, the game instance enrolled in the one of the plurality of digital gaming competitions;
   receiving, at the client device, game data for executing the game instance, the game instance requiring one or more pseudo-random numbers to complete execution of the game instance;
   generating, at the client device and using the at least one pseudo-random number seed, the one or more pseudo-random numbers; and
   using the one or more pseudo-random numbers for the one of the plurality of digital gaming competitions such that a beginning of gameplay experience is common between the game instance executing on the client device and a second game instance executing on a second client device and enrolled in the one of the plurality of digital gaming competitions,
       wherein the beginning of the gameplay experience is different between game instances enrolled in different digital gaming competitions, and
       wherein at least one of receiving and generating is implemented by at least one data processor forming part of the client device.

2. The method of claim 1,
   wherein the unique match identifier is associated with an instance of the one of the plurality of digital gaming competitions.

3. The method of claim 1, wherein a game server provides the game data for executing the game instance, and wherein the game instance is in communication with and receiving the game data from the game server.

4. The method of claim 1, wherein the client device includes a peer-wagering module, and wherein the peer-wagering module communicates with a transactional server to enable players to wager on an outcome of the one of the plurality of digital gaming competitions.

5. The method of claim 1, wherein the game instance includes a game engine, wherein the game engine uses the one or more pseudo-random numbers to generate gameplay attributes for the one of the plurality of digital gaming competitions.

6. The method of claim 5, wherein the gameplay attributes provide a common gameplay experience between the game instance executing on the client device and the second game instance executing on the second client device and enrolled in the one of the plurality of digital gaming competitions.

7. The method of claim 1, further comprising:
accessing, by one or more data processors, data characterizing historical gaming metrics for a player;
determining, by the one or more data processors using at least a portion of the accessed data and a set of rules, an advertisement to present to the player;
generating, by the one or more data processors, the advertisement; and
displaying, by the one or more data processors, the advertisement in an advertisement display space of the game instance.

8. The method of claim 7, wherein the advertisement prompts the player to enroll in another of the plurality of digital gaming competitions.

9. The method of claim 1, further comprising:
receiving, by one or more data processors, data characterizing game play of a player;
monitoring, by the one or more data processors, one or more characteristics of the received data; and
comparing, by the one or more data processors, the monitored characteristics to historical characteristics associated with the player to detect fraudulent behavior by the player,
wherein deviations between the monitored characteristics and the historical characteristics indicate fraud.

10. The method of claim 1, wherein the game instance is an asynchronous skill-based game having random elements.

11. A system, comprising:
at least one data processor; and
a memory storing instructions, which, when executed by the at least one data processor, cause the at least one data processor to perform operations comprising:
receiving, at a client device including a game instance, at least one pseudo random number seed characterized by a unique match identifier for one of a plurality of digital gaming competitions, the game instance enrolled in the one of the plurality of digital gaming competitions;
receiving, at the client device, game data for executing the game instance, the game instance requiring one or more pseudo-random numbers to complete execution of the game instance;
generating, at the client device and using the at least one pseudo-random number seed, the one or more pseudo-random numbers; and
using the one or more pseudo-random numbers for the one of the plurality of digital gaming competitions such that a beginning of gameplay experience is common between the game instance executing on the client device and a second game instance executing on a second client device and enrolled in the one of the plurality of digital gaming competitions,
wherein the beginning of the gameplay experience is different between game instances enrolled in different digital gaming competitions.

12. The system of claim 11,
wherein the unique match identifier is associated with an instance of the one of the plurality of digital gaming competitions.

13. The system of claim 11, wherein a game server provides the game data for executing the game instance, and wherein the game instance is in communication with and receiving the game data from the game server.

14. The system of claim 11, wherein the client device includes a peer-wagering module, and wherein the peer-wagering module communicates with a transactional server to enable players to wager on an outcome of the one of the plurality of digital gaming competitions.

15. The system of claim 11, wherein the game instance includes a game engine, wherein the game engine uses the one or more pseudo-random numbers to generate gameplay attributes for the one of the plurality of digital gaming competitions.

16. The system of claim 15, wherein the gameplay attributes provide a common gameplay experience between the game instance executing on the client device and the second game instance executing on the second client device and enrolled in the one of the plurality of digital gaming competitions.

17. The system of claim 11, the operations further comprising:
accessing, by one or more data processors, data characterizing historical gaming metrics for a player;
determining, by the one or more data processors using at least a portion of the accessed data and a set of rules, an advertisement to present to the player;
generating, by the one or more data processors, the advertisement; and
displaying, by the one or more data processors, the advertisement in an advertisement display space of the game instance.

18. The system of claim 11, the operations further comprising:
receiving, by one or more data processors, data characterizing game play of a player;
monitoring, by the one or more data processors, one or more characteristics of the received data; and
comparing, by the one or more data processors, the monitored characteristics to historical characteristics associated with the player to detect fraudulent behavior by the player,
wherein deviations between the monitored characteristics and the historical characteristics indicate fraud.

19. The system of claim 11, wherein the game instance is an asynchronous skill-based game having random elements.

20. A non-transitory computer program product storing executable instructions, which, when executed by at least one data processor forming part of at least one computing system, implement operations comprising:
receiving, at a client device including a game instance, at least one pseudo random number seed characterized by a unique match identifier for one of a plurality of digital gaming competitions, the game instance enrolled in the one of the plurality of digital gaming competitions;
receiving, at the client device, game data for executing the game instance, the game instance requiring one or more pseudo-random numbers to complete execution of the game instance;
generating, at the client device and using the at least one pseudo-random number seed, the one or more pseudo-random numbers; and
using the one or more pseudo-random numbers for the one of the plurality of digital gaming competitions such that a beginning of gameplay experience is common between the game instance executing on the client device and a second game instance executing on a second client device and enrolled in the one of the plurality of digital gaming competitions,
wherein the beginning of the gameplay experience is different between game instances enrolled in different digital gaming competitions.

* * * * *